United States Patent Office 3,365,318
Patented Jan. 23, 1968

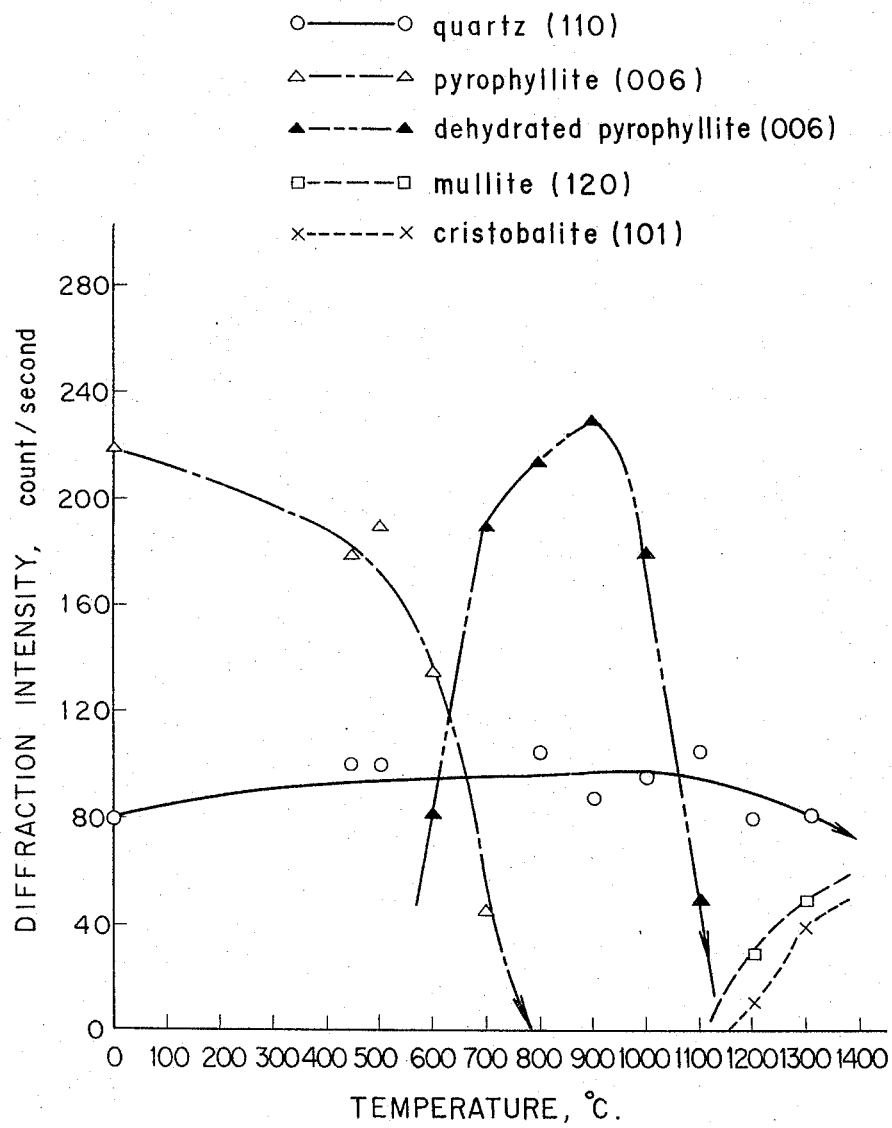

3,365,318
LOW TEMPERATURE BURNED REFRACTORY BRICK AND METHOD OF MAKING THE SAME
Naoyuki Nameishi, Kakogawa, Japan, assignor to Harima Refractories Company, Ltd., Takasago, Hyogo Prefecture, Japan
Filed Jan. 25, 1965, Ser. No. 427,759
5 Claims. (Cl. 106—65)

This invention relates to a refractory brick, and more particularly, to a method of making a novel and improved refractory brick by a relatively low temperature burning process.

In general, a refractory body is manufactured by a process which comprises adding an approprite amount of bonding clay to a chamotte material burned heavily at an elevated temperature, and subjecting the mixture of chamotte and bonding clay to a burning step for an extended period of time to obtain a refractory brick of desired shape and strength. In such a manufacturing process as above, it is required to carry out the burning step at a temperature higher than 1200° C. for an extended period of time in order to develop the strength of brick or to reduce the porosity thereof extremely where desired.

As a result, it is impossible for the high temperature burned refractory body to attain a predetermined uniform size and shape. Accordingly, a great deal of difficulty is encountered when it is desired to construct an industrial furnace with the above refractory brick.

In addition, when this refractory brick is applied to line a steel ladle, the joints between bricks therein become irregular and non-uniform due to the inaccurate size and shape of the brick with the result that the brick joints are attacked by the molten steel penetrated thereinto.

As described above, the manufacture of a refractory brick with added a bonding clay by burning it at an elevated temperature higher than 1200° C. results in the disadvantages enumerated above in the size and shape of the finished product. Therefore, it is one of the important problems in the refractory industry to overcome the above disadvantages.

In view of this, based on extensive research, I have discovered that a relatively low temperature burned refractory brick in accordance with the principle of this invention is characterized in that it exhibits expansion in actual service at elevated temperature higher than 1300° C., and this feature can be fully utilized to advantage.

In general, the conventional refractory brick of the prior art tends to shrink in the high temperature service, but the refractory brick of this invention is characterized by its expansion in actual service at high temperature. By the utilization of the above property of expansion in actual service at elevated temperature, the irregular and non-uniform size and shape of refractory bricks can be compensated for so that there is an advantage that defective joints between refractory bricks can be prevented when the bricks of this invention are used for the lining of a steel ladle.

Briefly stated, the present invention comprises providing a finely divided highly siliceous pyrophyllite refractory material, mixing an appropriate amount of sodium silicate therewith, molding this mixture in the absence of bonding clay under high pressure into a desired shape, and subjecting this molded product to burning at a relatively low temperature in the range of 800°–1200° C. The refractory brick thus manufactured is characterized in that it expands in the high temperature service zone. Further, this invention contemplates the reduction of the firing cost by the application of a relatively low temperature of 800° to 1200° C. heretofore regarded as the non-crystallization zone in the burning process of refractory material, and the decrease of irregular and non-uniform size and shape of refractory brick to a minimum together with the improvement of the physical properties thereof.

Accordingly, it is an object of this invention to provide an improved refractory brick which will withstand erosion and corrosion at high temperatures.

It is another object of the invention to provide a novel refractory brick which will withstand not only erosion at high temperature, but also compensate a defective joint between refractory bricks through expansion in actual service at elevated temperature.

Additional object of this invention is to provide a novel refractory brick in the absence of a bonding clay so that the disadvantage of bonding clay is eliminated and an entirely new and novel property different from that of the conventional one is fully developed.

A still further object is to provide a refractory brick of uniform size and shape manufactured by a firing process at a lower temperature than the conventional high temperature with a view to reducing the firing cost.

A still additional object is to provide a refractory brick adapted for the lining of a steel ladle in which the expansion property of the refractory brick during service at high temperature is utilized to prevent the ladle from damage due to the penetration of molten steel into a defective joint of bricks.

Other objects and advantages of the invention will be apparent from the following description which, taken in connection with the accompanying drawing, discloses a preferred embodiment thereof.

Referring to the drawing:

FIG. 2 shows the change diagram showing the change of mineral structure brought about in the highly siliceous pyrophyllite material in accordance with temperature.

FIGS. 1–2 are fully described in more detail later on.

Figure 1:
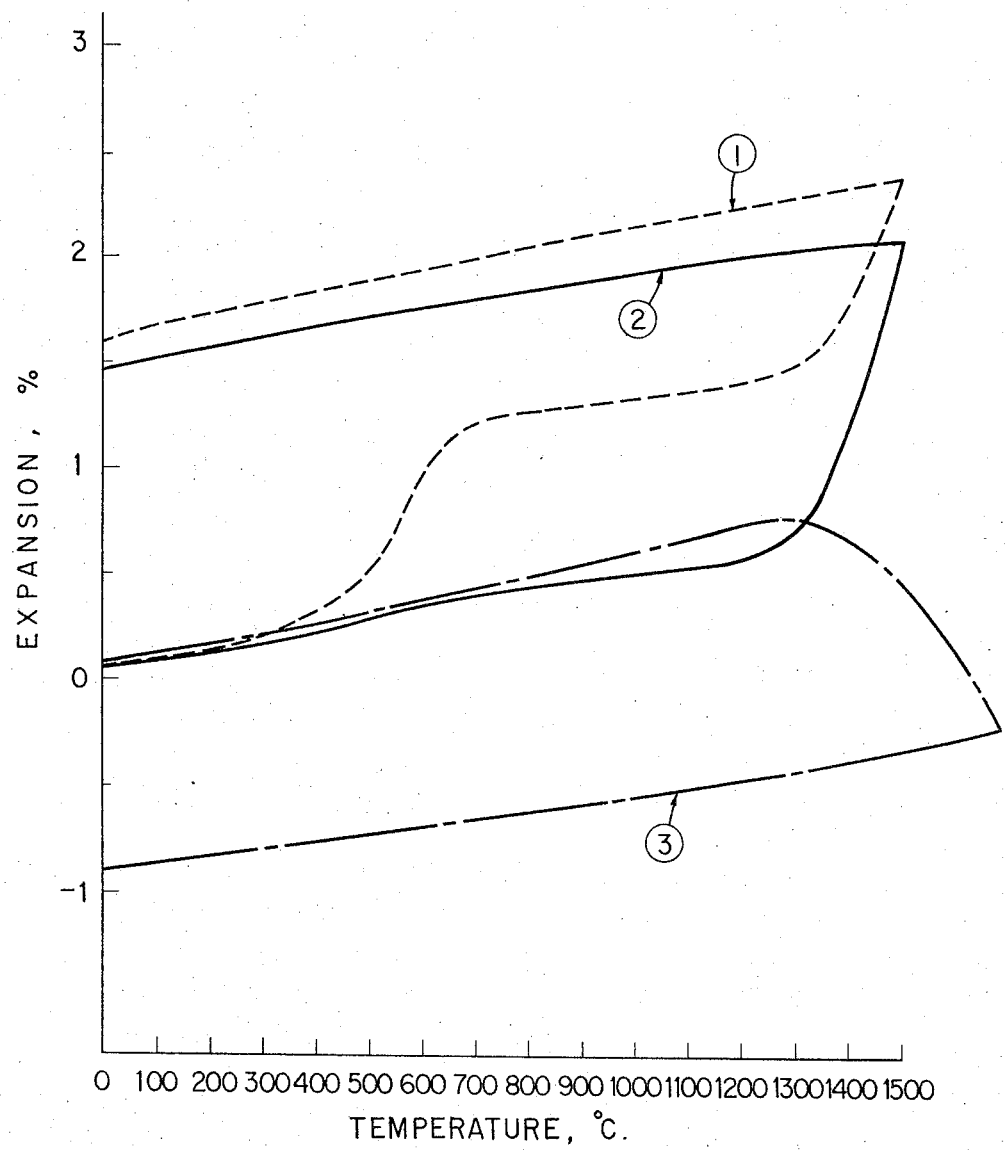
FIG. 1 shows the expansion graph or diagram versus temperature showing the pyrophyllite material employed according to this invention, the refractory brick produced by this invention, and the known refractory brick of prior art.

As described above, a principal refractory material for the manufacture of a novel refractory brick in accordance with this invention consists of a siliceous pyrophyllite material, $Al_2O_3 \cdot 4SiO_2 \cdot H_2O$, sometimes associated with silica mineral.

In reference to the above material for use in this invention, not only pyrophyllite mineral containing free silica, but also pyrophyllite material containing 66.7% $SiO_2$ and 28.3% $Al_2O_3$ is employed.

U.S. Patent No. 3,132,955, "Method for the Manufacture of Unburned Refractory Body," dated May 12, 1964, has been granted to me, the inventor, in connection with the application of a highly siliceous pyrophyllite mineral to the manufacture of a refractory brick in which the pyrophyllite mineral calcined at a temperature in the range of 900° to 1000° C. for a short period of time is employed for a starting material. However, in the present invention, an uncalcined pyrophyllite mineral material is used as a raw material.

In accordance with a preferred embodiment of the invention, the pyrophyllite mineral material is pulverized into two parts of different particle sizes, one part being coarse and the other fine, the intermediate particle size being removed, then formed into a most densely packed mixture consisting of coarse and fine grains, sodium silicate 1–7% by weight is added, then the mixture is molded into a shape under a high pressure, and finally the shaped molded product is burned at a temperature in the range of 800°–1200° C.

Referring to FIG. 1 in connection with the feature of this invention, the dotted curve 1 shows expansion versus temperature of a highly siliceous pyrophyllite mineral starting material in which expansion increases gradually with the increase of temperature in the direction towards the right relative to the diagram, and this curve rises up abruptly in the temperature range of 500° to 600° C., which shows the occurrence of α–β inversion of free silica contained in the pyrophyllite mineral material. The expansion increases as the curve rises, and it still increases as the temperature exceeds the temperature of 1300° C. where the inversion of β-quartz into cristobalite takes plate. Then the expansion lowers gradually in the direction towards the left with the decrease of temperature.

The solid curve 2 of FIG. 1 represents the temperature versus expansion of the relatively low temperature burned refractory brick of this invention in which the expansion rises abruptly as the temperature exceeds 1300° C., because the inversion of β-quartz into cristobalite occurs just as the material of this invention.

The dot-and-dash curve 3 of FIG. 1 represents the temperature versus expansion of a conventional high temperature burned refractory brick which clearly shows that it has a low expansion in the temperature range of room temperature to 1300° C. as in the case of the curve 2.

However, in reference to the above curves 2 and 3, FIGURE 1, clearly shows that the expansion of the former is entirely different from that of the latter in the temperature range of higher than 1300° C. The curve 2 abruptly rises up at a temperature in the neighborhood of 1400° C. to increase expansion while the curve 3, on the contrary, falls down suddenly at the same temperature to lower expansion.

As shown in the above, it is clearly understood from the curves 2 and 3 that the expansion of the low temperature burned refractory brick of this invention is entirely different from that of the known high temperature burned refractory brick of prior art in the high temperature service range above 1300° C., which is the characteristic of the present invention.

Next, in reference to FIG. 2 in connection with the feature of this invention, FIG. 2 shows the change of mineral structure in a highly siliceous pyrophyllite material in accordance with temperature in which the mineral assemblages, quartz, pyropyhllite, dehydrated pyrophyllite, mullite, and cristobalite are illustrated.

The ordinate of FIG. 2 refers to the diffraction intensity which shows the quantity or volume change of mineral constituents.

FIG. 2 shows that quartz and pyrophyllite appear at room temperature, pyrophyllite disappears at a temperature in the neighborhood of 800° C., and dehydrated pyrophyllite disappears at a temperature in the range of 1100° to 1200° C. Mullite and cristobalite appear at a temperature higher than 1200° C. The dehydrated pyrophyllite appears at a temperature in the range of 800° to 1200° C., and there takes place a little inversion of quartz into cristobalite with the result that there exists expansion, the characteristic of this invention, in the elevated temperature range of service.

The refractory brick of this invention does not contain a bonding clay, because the burning temperature lies in the range of temperature in which bonding clay exhibits non-sintering so that a brittle or weak structure will be induced.

Further, I have discovered that the addition of an appropriate amount of finely divided chromium oxide to the matrix would increase resistance to corrosion of the low temperature burned refractory brick of this invention, more particularly for the refractory brick applied to the lining of a steel ladle where a high degree of resistance to corrosion is required.

The reason for the enhancement of corrosion resistance by the addition of chromium oxide as above will be attributed to the fact that some relatively low-melting products formed by the interaction of FeO, $Fe_2O_3$ and CaO contained in the slag of the molten steel with $Cr_2O_3$ in the refractory matrix are of higher melting points than those resulting from the above reaction of the highly siliceous material with the slag ingredients in the absence of $Cr_2O_3$ in the matrix.

I have also discovered that sodium silicate is effective and advantageous in improving the strength of green brick as well as of finished product after firing, inhibiting the α–β inversion of free silica contained in the highly siliceous pyrophyllite mineral at a temperature in the neighborhood of 570° C., reducing the expansion property of the refractory brick in the range of room temperature to 1300° C., to a minimum, and improving its spalling resistance.

I limit the burning temperature to the range of 800° to 1200° C. because the burning process at an elevated temperature above 1200° C. will result in a high firing cost, and besides, the sintering due to sodium silicate proceeds abruptly to lower its resistance to spalling.

If the burning process is caried out at a temperature below 800° C., the inhibition of α–β inversion of free silicate contained in the highly siliceous pyrophyllite mineral at a temperature in the neighborhood of 570° C. cannot be effected.

As fully described in the foregoing, the advantages of the novel low temperature burned refractory brick manufactured in accordance with the principle of the present invention are summarized hereinbelow:

(1) On account of the relatively low temperature burning process, the burning equipment will be simplified, which results in a considerable reduction of firing cost.

(2) On account of the addition of sodium silicate and the firing process at a temperature of 800° to 1200° C., the refractory brick of this invention exhibits a very low coefficient of expansion, which results in the resistance to spalling.

(3) Distortion and irregular size resulting from the high temperature burning process are reduced.

(4) The addition of chromium oxide to the refractory brick of this invention will increase its resistance to corrosion to a high degree.

The invention will be fully described in reference to the following example:

EXAMPLE

*Proportions of ingredients*

| Ingredient | Particle size | Percent by Weight ||
|---|---|---|---|
| | | (1) | (2) |
| 1. Highly siliceous pyrophyllite mineral. | 3–1 mm. | 60 | 60 |
| 2. Same as 1. | 0.3 mm. or less. | 40 | 40 |
| 3. Sodium silicate. | | 7 | 7 |
| 4. Chromium oxide. | | | 5 |

*Chemical analysis of ingredients*

(1) Highly siliceous pyrophyllite mineral:   Percent
    $SiO_2$ ---------------------------------- 78.4
    $TiO_2$ ---------------------------------- 0.59
    $Al_2O_3$ -------------------------------- 16.25
    $Fe_2O_3$ -------------------------------- 0.97
    CaO ------------------------------------- 0.11
    MgO ------------------------------------- 0.12
    Ignition loss --------------------------- 3.00

Total ----------------------------------- 99.44

(2) Sodium silicate (liquid) _____ $Na_2O \cdot 3SiO_2 + H_2O$
(3) Chromium oxide (purity 99% or more) ____ $Cr_2O_3$ The above highly siliceous pyrophyllite mineral material is finely divided to the above specified fineness of particle size, then charged into a mixer, and subsequently subjected to mixing and kneading with the addition of sodium silicate for a period of 5 to 6 minutes. Thereafter, it is molded under a high pressure of about 7,000 to 19,000 pounds per square inch by means of a friction press into a desired shape, then allowed to dry at room temperature, and subjected to burning in a tunnel kiln at the temperature of 1200° C. for about 72 hours. The chemical analysis and the physical properties of the relatively low temperature burned refractory brick obtained by the above manufacturing method are described hereinbelow:

*Chemical analysis*

| | Percent |
|---|---|
| $SiO_2$ | 81.3 |
| $TiO_2$ | 0.61 |
| $Al_2O_3$ | 16.85 |
| $Fe_2O_3$ | 1.01 |
| CaO | 0.11 |
| MgO | 0.12 |
| $Na_2O$ | 0.97 |
| Ignition loss | 0.30 |
| Total | 101.27 |

*Physical properties*

| | (1) | (2) |
|---|---|---|
| Apparent specific gravity | 2.60 | 2.61 |
| Bulk specific gravity | 2.24 | 2.24 |
| Porosity | 14.4 | 14.6 |
| Compressive strength, kg./cm.$^2$ | 366 | 350 |
| Softening point (° C.) under load at high temperatures according to JIS (Japanese Industrial Standard), R2209: | | |
| $T_1$ | 1,100 | 1,200 |
| $T_2$ | 1,210 | 1,250 |
| $T_3$ | 1,460 | 1,480 |
| Refractoriness, Seger Cone (SK) | 26+ | 26+ |
| Expansion, percent: | | |
| At 1,000° C | 0.5 | 0.5 |
| At 1,500° C | 1.8 | 1.9 |
| Corrosion resistance, percent | 100 | 60 |

When the brick is completely corroded, it is 100%; the less, the better.

In reference to JIS R2209, Method of Test for Softening of Refractory Brick Under Load at High Temperatures, it is briefly stated as follows: when the sample, 50 mm. x 50 mm. of refractory brick is subjected to the load, 2 kg./cm.$^2$ while heating at the rate of 6° C. per minute, the temperature at which it is beginning to soften shall be $T_1$, the temperature at which the initial height of the sample has been compresed to 2% be $T_2$, and the temperature at which it has been compressed to 20% be $T_3$.

The results of the actual test in which the relatively low temperature burned refractory brick produced in accordance with the method of the invention has been applied to the steel ladle of 100 ton capacity are as follows:

| | No. of heats |
|---|---|
| Example 1 | 56 |
| Example 2 | 65 |
| Prior art brick | 47 |

The invention is not limited to the specific method described, but departures may be made therefrom within the scope of the accompanying claims without departing from the principles of the invention and without sacrificing its chief advantages.

Having thus described my invention, what I claim is:

1. A method for the manufacture of a relatively low temperature burned refractory brick which comprises pulverizing a highly siliceous pyrophyllite mineral material into a mixture consisting essentially of grains of particle size of 1–3 mm. and of grains of particle size of 0.3 mm. or less, mixing said pulverized highly siliceous pyrophyllite mineral material and sodium silicate, molding said mixture in the absence of a bonding clay under a pressure of about 7,000 to 19,000 pounds per square inch into a desired shape, drying said molded body, then subjecting said dried molded body to burning at a temperature of 800° to 1200° C. for a period of about 72 hours, and finally to cooling to room temperature.

2. A method for the manufacture of a relatively low temperature burned refractory brick which comprises pulverizing a highly siliceous pyrophyllite mineral material into two parts of different particle sizes, one part being pulverized to the particle size of 1–3 mm. and the other part to the particle size of 0.3 mm. or less, providing a mixture consisting of 60% by weight of said pulverized pyrophyllite mineral material with the particle size of 1–3 mm., and 40% by weight of said pulverized pyrophyllite mineral material with the particle size of 0.33 mm. or less, adding 7% by weight of sodium silicate, subjecting said mixture to thorough mixing and kneading, then molding said mixture in the absence of a bonding clay under a pressure of 7,000 to 19,000 pounds per square inch into a desired shape, then drying said molded body, then subjecting said dried molded body to burning at a temperature of 800° to 1200° C. for a period of about 72 hours and finally cooling said burned body to room temperature.

3. A method for the manufacture of a relatively low temperature burned refractory brick which comprises pulverizing a highly siliceous pyrophyllite mineral material into a mixture consisting essentially of grains of particle size of 1–3 mm. and of grains of particle size of 0.3 mm. or less, adding sodium silicate and chromium oxide to said mixture of pulverized pyrophyllite mineral material, molding said mixture of pyrophyllite, sodium silicate, and chromium oxide in the absence of a bonding clay under a pressure of about 7,000 to 19,000 pounds per square inch into a desired shape, drying said molded body, then subjecting said dried molded body to burning at a temperature of 800° to 1200° C. for a period of about 72 hours and finally to cooling to room temperature.

4. A method for the manufacture of a relatively low temperature burned refractory brick which comprises pulverizing a highly siliceous pyrophyllite mineral material into two parts of different particle sizes, one part being pulverized to the particle size of 1–3 mm. and the other part to the particle size of 0.3 mm. or less, providing a mixture consisting of 60% by weight of said pulverized pyrophyllite mineral material with the particle size of 1–3 mm., and 40% by weight of said pulverized pyrophyllite mineral material with the particle size of 0.3 mm. or less, adding 7% by weight of sodium silicate and 5% by weight of finely divided chromium oxide, subjecting said mixture to thorough mixing and kneading, then molding said mixture in the absence of a bonding clay under a pressure of 7,000 to 19,000 pounds per square inch into a desired shape, then drying said molded body, then subjecting said dried molded body to burning at a temperature of 800° to 1200° C. for a period of about 72 hours and finally cooling said burned body to room temperature.

5. As an article of manufacture, a refractory brick manufactured by a process according to claim 1.

References Cited

UNITED STATES PATENTS

| 3,199,992 | 8/1965 | Moffitt | 106—39 |
| 3,253,067 | 5/1966 | Tomita | 264—63 |
| 3,132,955 | 5/1964 | Nameishi | 106—67 |

OTHER REFERENCES

Dana: Handbook of Minerology, p. 493. (Copy available in 264/Clay Treatment Digest.)

ROBERT F. WHITE, *Primary Examiner.*

R. B. MOFFITT, J. A. FINLAYSON, J. R. HALL, *Assistant Examiners.*